(12) United States Patent
Masuda et al.

(10) Patent No.: US 12,013,145 B2
(45) Date of Patent: Jun. 18, 2024

(54) DRY ROOM AND METHOD FOR CONTROLLING SAME

(71) Applicant: NIHON SPINDLE MANUFACTURING CO., LTD., Hyogo (JP)

(72) Inventors: Katsuhiro Masuda, Hyogo (JP); Masafumi Yamaguchi, Hyogo (JP); Akira Ueda, Hyogo (JP)

(73) Assignee: NIHON SPINDLE MANUFACTURING CO., LTD., Hyogo (JP)

( * ) Notice: Subject to any disclaimer, the term of this patent is extended or adjusted under 35 U.S.C. 154(b) by 372 days.

(21) Appl. No.: 17/407,849

(22) Filed: Aug. 20, 2021

(65) Prior Publication Data

US 2021/0381702 A1   Dec. 9, 2021

Related U.S. Application Data

(63) Continuation of application No. PCT/JP2020/007547, filed on Feb. 25, 2020.

(30) Foreign Application Priority Data

Mar. 29, 2019   (JP) .................. 2019-069459

(51) Int. Cl.
| | |
|---|---|
| *F25B 17/06* | (2006.01) |
| *F24F 3/147* | (2006.01) |
| *F24F 7/08* | (2006.01) |
| *F24F 11/30* | (2018.01) |
| *F24F 3/14* | (2006.01) |

(52) U.S. Cl.
CPC ............... *F24F 3/147* (2013.01); *F24F 7/08* (2013.01); *F24F 11/30* (2018.01); *F24F 2003/144* (2013.01); *F24F 2003/1458* (2013.01)

(58) Field of Classification Search
CPC .... F24F 3/147; F24F 11/30; F24F 7/08; F24F 2003/114; F24F 2003/1458
USPC ........................................ 62/411
See application file for complete search history.

(56) References Cited

U.S. PATENT DOCUMENTS 3,128,158 A * 4/1964 Colvin ............... F24F 3/044
34/535
2018/0213631 A1   7/2018 Sakamoto et al.

FOREIGN PATENT DOCUMENTS

| CN | 108483845 A | * | 9/2018 |
| DE | 2947396 B1 | * | 10/2018 |
| JP | H04-350434 A |   | 12/1992 |
| JP | 2003083578 A | * | 3/2003 |

(Continued)

OTHER PUBLICATIONS

Search Report issued in European Application No. 20784844.1, dated Apr. 21, 2022.

(Continued)

*Primary Examiner* — Davis D Hwu
(74) *Attorney, Agent, or Firm* — Michael Best & Friedrich LLP

(57) ABSTRACT

A dry room that controls a dew point temperature in a space to be managed, the room includes a plurality of exhaust units that exhaust air in the space to be managed, in which the plurality of exhaust units are disposed in different regions in the space to be managed, and individually adjust an exhaust amount of the air to be exhausted from each of the regions.

20 Claims, 11 Drawing Sheets

(56) References Cited

FOREIGN PATENT DOCUMENTS

| | | | |
|---|---|---|---|
| JP | 2004-116854 A | | 4/2004 |
| JP | 2007-132602 A | | 5/2007 |
| JP | 2007132602 A | * | 5/2007 |
| JP | 2008-045864 A | | 2/2008 |
| JP | 2008-076032 A | | 4/2008 |
| JP | 2009-174828 A | | 8/2009 |
| JP | 2011-190989 A | | 9/2011 |
| JP | 2013-081900 A | | 5/2013 |
| JP | 2014-047990 A | | 3/2014 |
| JP | 2014-169815 A | | 9/2014 |
| JP | 2015047579 A | * | 3/2015 |
| JP | 2018-066542 A | | 4/2018 |
| JP | 2019-143933 A | | 8/2019 |

OTHER PUBLICATIONS

International Search Report issued in Application No. PCT/JP2020/007547, mailed Jun. 2, 2020.

* cited by examiner

DRY ROOM AND METHOD FOR CONTROLLING SAME

RELATED APPLICATIONS

The contents of Japanese Patent Application No. 2019-069459, and of International Patent Application No. PCT/JP2020/007547, on the basis of each of which priority benefits are claimed in an accompanying application data sheet, are in their entirety incorporated herein by reference.

BACKGROUND

Technical Field

Certain embodiments of the present invention relate to a dry room used in secondary battery production or the like which requires a managed humidity environment. In addition, the present invention also relates to a method for controlling a dry room.

Description of Related Art

A dry room of which the environmental conditions are controlled to very low humidity is used in a production line of slurry for electrodes of batteries. For example, the related art discloses a dry room used to maintain only the atmospheres of limited necessary places in a predetermined low humidity state. In the dry room, curtains forming a peripheral wall of a dry room main body have a double structure, and air is forcibly exhausted from a space formed between the curtains of the double structure. Then, the exhausted air is processed by a dehumidifying unit, and is supplied to a space partitioned off by an inner curtain of the curtains of the double structure and the space formed between the curtains of the double structure. Accordingly, the amount of air-conditioned air to be supplied into the dry room can be reduced, and the influence of the entry or exit of people can be eliminated as much as possible while suppressing the outflow of substances in the dry room to an external space.

SUMMARY

According to an embodiment of the present invention, there is provided a dry room that controls a dew point temperature in a space to be managed, the room including: a plurality of exhaust units that exhaust air in the space to be managed. The plurality of exhaust units are disposed in different respective regions in the space to be managed, and individually adjust an exhaust amount of the air to be exhausted from each of the regions.

According to the dry room, since the exhaust units disposed in the different respective regions in the space to be managed individually adjust the exhaust amount of the air to be exhausted from each of the regions, the dew point temperature of each region can be controlled according to a change in the dew point temperature of each region in the space to be managed . For this reason, according to the dry room, the air which has risen in dew point temperature can be preferentially exhausted to normalize quickly a rise in dew point temperature in the space to be managed, which is an effect.

According to another embodiment of the present invention , there is provided a method for controlling a dry room including: an exhaust step of exhausting air in a space to be managed from different regions in the space to be managed; and an exhaust amount adjustment step of individually adjusting exhaust amounts of the air to be exhausted from the regions.

According to the method for controlling a dry room, since the exhaust amounts of the air to be exhausted from the different regions in the space to be managed are individually adjusted, the dew point temperature of each of the regions can be controlled according to a change in the dew point temperature of each of the regions in the space to be managed. For this reason, according to the method for controlling a dry room, the air which has risen in dew point temperature can be preferentially exhausted to normalize quickly a rise in dew point temperature in the space to be managed, which is an effect.

BRIEF DESCRIPTION OF THE DRAWINGS

FIG. 1A is a front view of the dry room. FIG. 1B is a rear view of the dry room. FIG. 1C is a left side view of the dry room. FIG. 1D is a plan view of the dry room.

FIG. 4A is a front view of the exhaust unit. FIG. 4B is a perspective view of the exhaust unit. FIG. 4C is a cross-sectional view of the exhaust unit taken along line A-A'. FIG. 4D is a perspective view of an A-A' cross section of the exhaust unit.

FIG. 5A illustrates exhaust units disposed in different respective regions of the dry room. FIG. 5B is a schematic descriptive view illustrating individual control of the exhaust amounts of air of the exhaust units disposed in the different respective regions.

FIG. 6A is a schematic descriptive view illustrating individual control of the exhaust amount of air of the exhaust unit by the detection unit. FIG. 6B is a schematic descriptive view illustrating individual control of the exhaust amount of air of the exhaust unit by the detection unit when a worker moves into a space to be managed.

FIG. 7A is a front view of the dry room. FIG. 7B is a schematic descriptive view describing control according to a second detection unit that detects the entry of a substance causing a rise in dew point temperature.

FIG. 9A is a front view of the dry room. FIG. 9B is a rear view of the dry room. FIG. 9C is a left side view of the dry room. FIG. 9D is a plan view of the dry room.

FIG. 11A is a front view of the dry room. FIG. 11B is a schematic descriptive view illustrating individual control of the exhaust amount of air of a predetermined region.

DETAILED DESCRIPTION

Figure 1A:
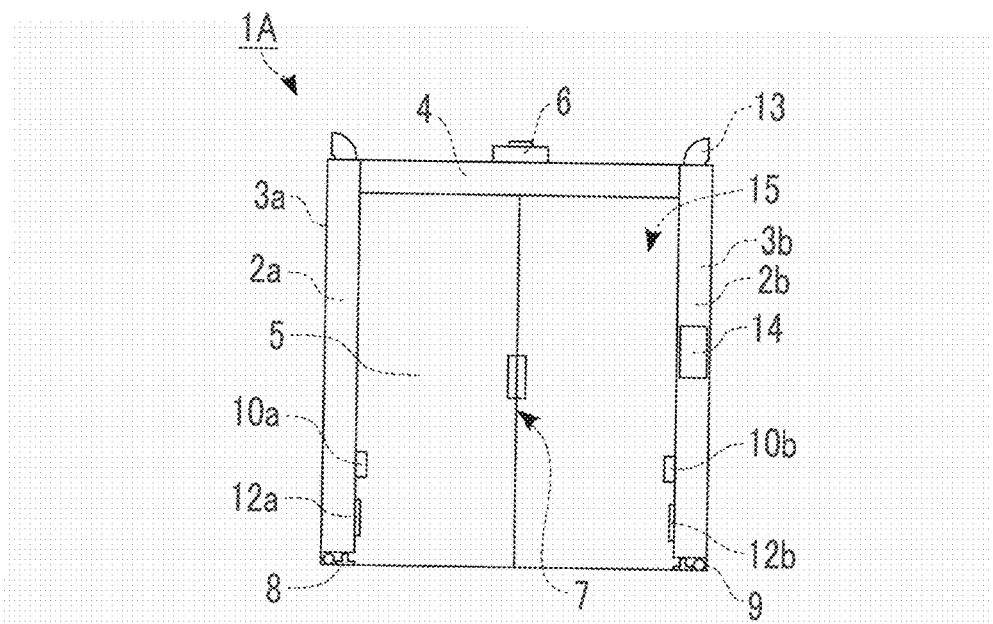
FIGS. 1A to 1D are schematic descriptive views illustrating a structure of a dry room according to one embodiment of the present invention.

Managing the humidity of a work space to be very low is important to a production process of secondary batteries. However, the humidity of the work space increases temporarily due to the entry or exit of a worker, moisture emitted from the worker, or the like, which is a problem.

Therefore, it is desirable to provide a dry room capable of efficiently adjusting humidity in the room and quickly managing the humidity when the humidity of a predetermined space in the dry room has risen or when the humidity is expected to rise.

The inventors have recognized that in a dry room, air in the vicinity of a region which has risen (rises) in dew point temperature can be preferentially exhausted from an exhaust unit to normalize quickly a rise in dew point temperature in a space to be managed, and have completed the present invention.

Namely, the present invention provides the following dry room.

Further, as one embodiment of the present invention, the dry room may further include a first detection unit that detects a substance causing a rise in the dew point temperature of the air in the dry room.

According to the dry room, a substance causing a rise in the dew point temperature of the air is detected, and the exhaust amount of the air of the region is controlled. For this reason, in the space to be managed, a region in which the dew point temperature of the air changes can be accurately determined, and the exhaust amount can be appropriately controlled, which is an effect.

Further, as one embodiment of the present invention, the dry room may further include a second detection unit that detects intrusion of a substance, which causes a rise in the dew point temperature, into the regions in advance.

According to the dry room, in order to detect the entry or exit of a substance such as a worker or water, which causes a rise in dew point temperature in the room, in advance, the control of the dew point temperature for the entry or exit of the substance, such as increasing the exhaust amount of the exhaust units in the vicinity of an entrance, can be promptly performed, which is an effect.

Further, as one embodiment of the present invention, the dry room may further include a control unit that controls the dew point temperature of the air in the regions.

According to the dry room, the dew point temperature of the air of each of the regions is detected, and the exhaust amount of the air of the region is controlled according to a change in the measured value thereof. For this reason, in the space to be managed, a region in which the dew point temperature of air changes can be accurately determined, and the exhaust amount can be appropriately controlled, which is an effect.

Hereinafter, embodiments of a dry room according to the present invention will be described in detail with reference to the drawings. Incidentally, dry rooms to be described in the embodiments are provided merely as examples for describing the dry room according to the present invention, and the present invention is not limited thereto.

Figure 1B:
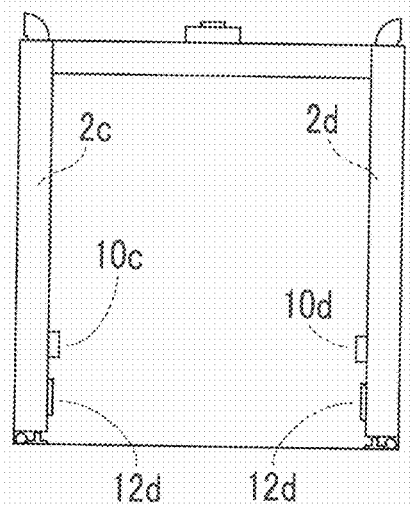
Figure 1C:
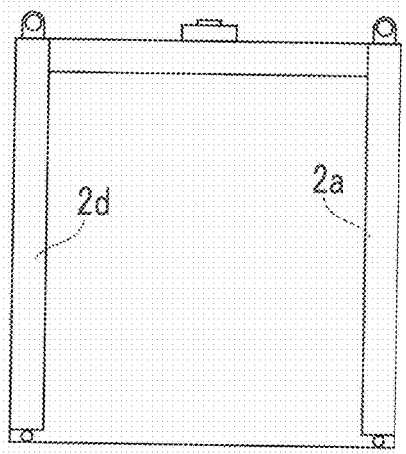
Figure 1D:
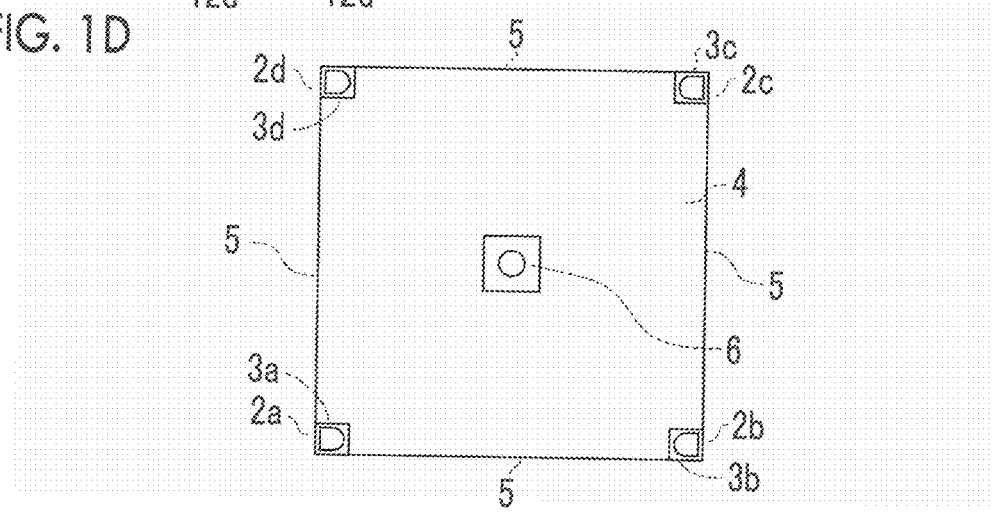

In addition, each step in a method for controlling a dry room will be described by operation of each configuration of the dry room corresponding to each step. One Embodiment FIGS. 1A to 1D are schematic descriptive views illustrating a structure of a dry room 1A according to one embodiment of the present invention. FIG. 1A is a front view of the dry room 1A, FIG. 1B is a rear view of the dry room 1A, FIG. 1C is a left side view of the dry room 1A, and FIG. 1D is a plan view of the dry room 1A. Incidentally, since a right side view of the dry room 1A is the same as the left side view of the dry room 1A of FIG. 1C, the right side view is omitted. In addition, since the dry room 1A does not include a floor surface, a bottom view is also omitted.

The dry room 1A of the present invention is disposed in a factory or a building, and adjusts the dew point temperature of an internal space to be lower than that of an external space, to provide a work space for work to be performed under a low humidity environment such as a production process. As illustrated in FIG. 1, the dry room 1A of the present invention includes four pillars 3a to 3d that include exhaust units 2a to 2d, respectively, and a ceiling 4. The periphery of the dry room 1A is surrounded by a vinyl curtain 5, so that a space 15 to be managed having a lower dew point temperature than the external space is formed thereinside. Incidentally, in the present invention, the "dew point temperature" substantially indicates the degree of dryness of a space, and even when the space is actually managed according to the dew point temperature, the space maybe managed according to another index such as humidity which indicates the dry state of the space.

The dry room 1A of the present invention includes a supply unit 6 that supplies air with an adjusted dew point temperature, and an exhaust unit 2 that exhausts air of the space 15 to be managed, and adjusts the dew point temperature of the space 15 to be managed to be lower than that of the external space. Further, the dry room 1A of the present invention is a dry room that controls the dew point temperature in the space 15 to be managed, and includes a plurality of the exhaust units 2a to 2d that exhaust air in the space 15 to be managed. The plurality of exhaust units 2a to 2d are disposed in different respective regions in the space 15 to be managed (refer to regions "Ra" to "Rd" in FIG. 5A) to regulate individually the exhaust amount of air to be exhausted from each of the regions.

Incidentally, "control" in the present invention means adjusting the dew point temperature in the space 15 to be managed in the dry room 1A, and includes, for example, operations of not only adjusting the dew point temperature in the space to be managed to a predetermined temperature, but also lowering the dew point temperature in the space to be managed than the dew point temperature outside the space to be managed.

Hereinafter, each part will be described in detail. Space to Be Managed

As illustrated in FIGS. 1A to 1D, the space 15 to be managed includes the pillars 3a to 3d, the ceiling 4, and the vinyl curtain 5 that covers a front, a rear, and both sides of the space 15 to be managed. The ceiling 4 includes the supply unit 6 that supplies air with an adjusted dew point temperature, and the vinyl curtain 5 at the front includes an entrance 7 for the entry or exit of a worker or the like. Ventilation passages (not illustrated) through which air is ventilated are provided inside the pillars 3*a* to 3*d*, respectively, and form the exhaust units 2*a* to 2*d* that exhaust air of the space 15 to be managed. In addition, an adjuster 8 and a caster 9 are provided in a bottom portion of each of the pillars 3*a* to 3*d*.

The adjusters 8 that are attached to the pillars 3*a* to 3*d*, respectively, fix the position of the dry room 1A and individually adjust the height of each pillar. In addition, the casters 9 contributes to moving the dry room 1A. Accordingly, the dry room 1A can be easily and freely moved and fixed.

The pillars 3*a* to 3*d*, the ceiling 4, and the vinyl curtain 5 form a closed space isolated from the outside. Accordingly, the space 15 to be managed can be provided of which the humidity can be managed.

In addition, the entrance 7 installed at the front of the dry room 1A allows a worker to enter or exit from or products to be carried in or out of the space 15 to be managed. Incidentally, the space 15 to be managed is a space in which a worker performs work or the like, or may be an unmanned space in which only a machine or the like is present.

The size or shape of the dry room 1A and the installation places or the number of the entrances 7 may be arbitrarily set which are suitable for the use of the space 15 to be managed. For example, the entrance 7 may be provided at the rear of the dry room 1A illustrated in FIGS. 1A to 1D and integrated with the entrance 7 in the front surface of another similar dry room 1A to connect a plurality of the dry rooms.

In addition, in order to improve a work environment in the dry room 1A, a lighting fixture may be installed in the dry room 1A. For example, the installation place of the lighting fixture may be the surface or the inside of a pillar portion 3 or the ceiling 4. It is preferable that the installation place is the inside of the ceiling 4.

In addition, the material of the vinyl curtain 5 is not particularly limited as long as the material does not allow air in the space 15 to be managed to pass therethrough. Exemplary examples of the material include a transparent or light-shielding material and a polymer material that prevents electric charging. When people perform work in the space 15 to be managed, a transparent material that prevents electric charging is favorable from the viewpoint of safety or the like.

Further, a weight maybe disposed such that air in the space 15 to be managed does not excessively leak from a hem of the vinyl curtain 5. In addition, it is desirable that the vinyl curtain 5 has a weight at the entrance 7 such that air in the space 15 to be managed does not leak more than necessary.

Incidentally, in the dry room 1A of one embodiment, the vinyl curtain 5 is used as an enclosure that forms the space 15 to be managed; however, in the dry room of the present invention, enclosures other than the vinyl curtain 5 may be used to form the space 15 to be managed. For example, instead of the vinyl curtain 5, plate materials such as wood, steel, stone, and hard plastic may be used. The vinyl curtain 5 is favorable in that the vinyl curtain 5 does not allow air to pass therethrough and is light and easy to move. In addition, since the transparent vinyl curtain is used, the vinyl curtain also has an advantage that a safety status of a worker thereinside can be checked from the outside.

Air with an adjusted dew point temperature is supplied from the supply unit 6 to the space 15 to be managed, and inside air is exhausted from the exhaust units 2*a* to 2*d*. At that time, the supply amount of air from the supply unit 6 is set to be larger than the total exhaust amount of the exhaust units 2*a* to 2*d*. Accordingly, the pressure inside the space 15 to be managed becomes a positive pressure. Therefore, even when the entrance 7 is temporarily opened at the time of the entry or exit of a worker, outside air is unlikely to flow into the space 15 to be managed, which is an effect.

Supply Unit

Figure 3:
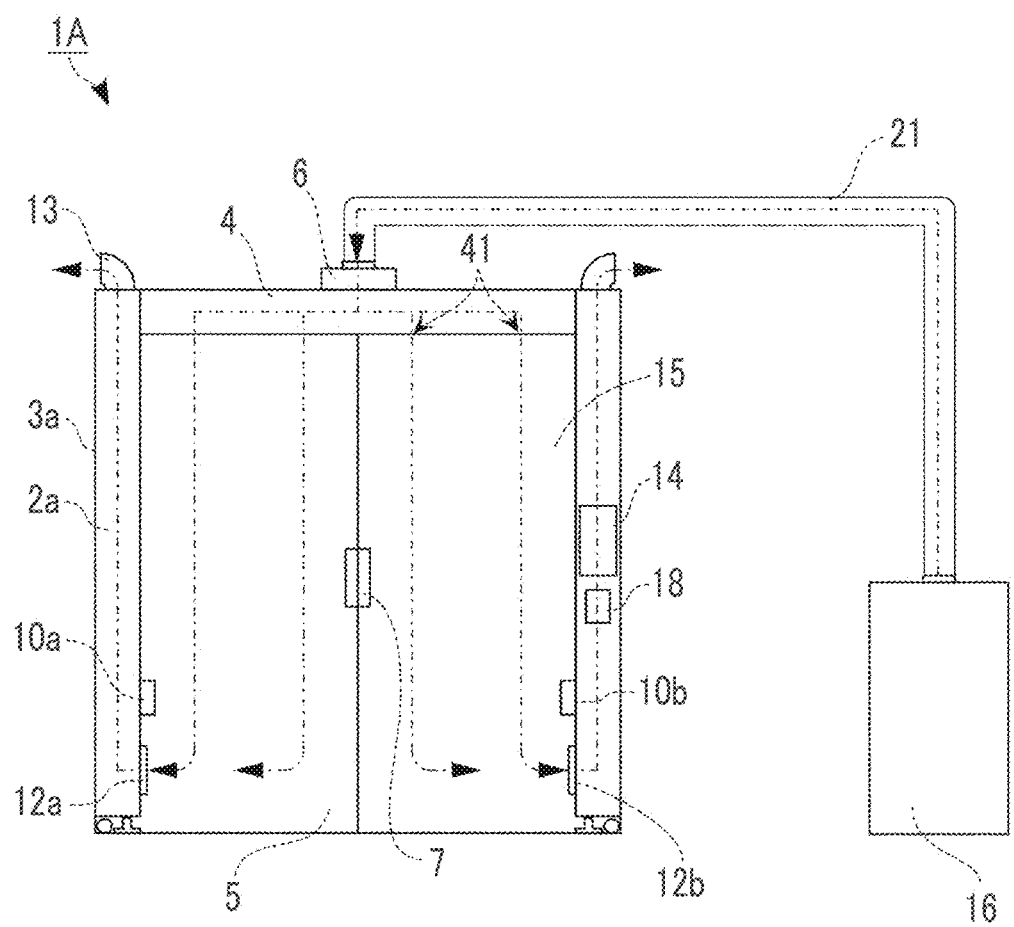
FIG. 3 is a schematic descriptive view illustrating a structure of the dry room and a dehumidifying device according to one embodiment of the present invention.

FIG. 1D is a plan view of the dry room. In the dry room 1A, as illustrated in FIG. 1D, the supply unit 6 is disposed at the center of an upper portion of the ceiling 4 . As illustrated in FIG. 3, the supply unit 6 is connected to a dehumidifying device 16 via an air supply hose 21. Air that is processed by the dehumidifying device 16 and has an adjusted dew point temperature is supplied to the dry room 1A from the supply unit 6 through the air supply hose 21. Incidentally, the ceiling 4 has a space (not illustrated) extending in a horizontal direction, and a plurality of supply holes 41 are formed on a space 15 to be managed side of the ceiling 4 . The air supplied from the supply unit 6 flows through the space inside the ceiling 4, so that the air diffuses in the horizontal direction and flows from each of the supply holes 41 into the space 15 to be managed (incidentally, the flow of the air is illustrated by an alternate long and short dash line in FIG. 3). Accordingly, the air processed by the dehumidifying device 16 can be supplied to a wide range of the space 15 to be managed.

Incidentally, the disposition places or the number of the supply units 6 maybe arbitrarily set as long as the humidity in the dry room 1A can be promptly managed.

The flow of the air that has an adjusted dew point temperature and is supplied from the ceiling 4 is not particularly limited as long as the air can be quickly distributed to the space 15 to be managed. For example, the flow of the air may be a unidirectional flow that travels in parallel streamlines in one direction at a constant flow speed, or may be a non-unidirectional flow of which the direction is not fixed. Incidentally, the unidirectional flow is favorable in that since the diffusion of contamination can be suppressed by the plug flow without turbulence and air in the space to be managed can be replaced with a clean gas, not only the humidity in the space 15 to be managed can be managed but also the cleanness can be maintained.

In addition, the air flowing in from the supply unit 6 may be processed by any air filter. Accordingly, suspended fine particles, suspended microorganisms, and the like that have not been removed by the dehumidifying device 16 can be removed.

The dehumidifying device 16 may be any device as long as the dehumidifying device 16 can manage the humidity of the space 15 to be managed. For example, a desiccant type dehumidifying device having high dehumidifying performance is favorable.

Exhaust Unit

Figure 4A:
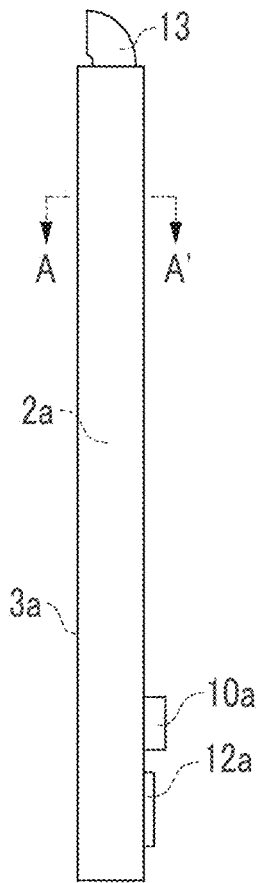
FIGS. 4A to 4D are schematic descriptive views illustrating a structure of an exhaust unit of the dry room according to one embodiment of the present invention.
Figure 4B:
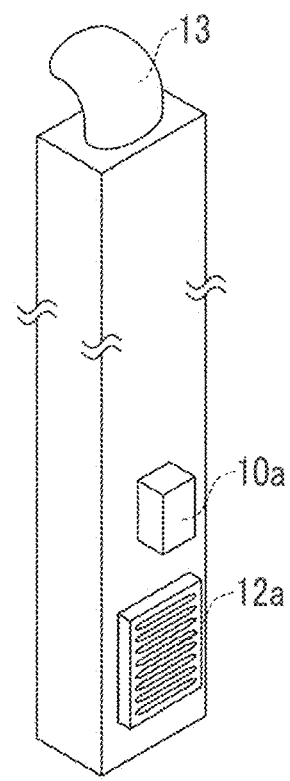

Ventilation passages (not illustrated) through which air is ventilated are provided inside the pillars 3*a* to 3*d*, respectively, and form the exhaust units 2*a* to 2*d* that exhaust air of the space 15 to be managed. FIGS. 4A to 4D illustrate a structure of the exhaust unit 2*a*. FIG. 4A is a front view and FIG. 4B is a perspective view. Incidentally, since the exhaust units 2a to 2d have the same structure, the description of the exhaust units 2b to 2d will be omitted. An intake port 12a that takes air of the space 15 to be managed into the pillar 3a is formed in the bottom portion of the pillar 3a, and an exhaust duct 13 that exhausts air in the pillar 3a to the outside is formed in an upper portion of the pillar 3a. Incidentally, each exhaust ducts 13 is connected to the dehumidifying device 16 by an exhaust hose (not illustrated).

Figure 4C:
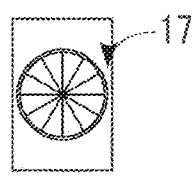
Figure 4D:
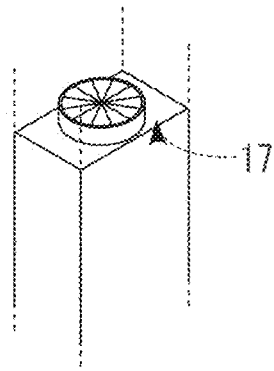

In addition, an intake fan 17 that blows air in the pillar 3a from the intake port 12a to the exhaust duct 13 is installed in the ventilation passage inside the pillar 3a. FIGS. 4C and 4D illustrates an internal structure of the pillar 3a. FIG. 4C is a cross-sectional view cut along line A-A' in FIG. 4A, and FIG. 4D is a perspective view thereof. Incidentally, the intake fans 17 that are installed in the pillars 3a to 3d, respectively, are capable of individually adjusting the air blow amount.

In addition, the exhaust amounts of the exhaust units 2a to 2d may be adjusted by any means. Exemplary examples of the means include means for adjusting the exhaust amount by the opening degree of a damper that is provided in an intake port 12 and is capable of the opening degree, means for adjusting the exhaust amount by the number of open dampers of a plurality of dampers provided, and the like. In addition, the exhaust units 2a to 2d includes first detection units 10a to 10d, respectively, which detect a worker or the like.

Figure 5A:
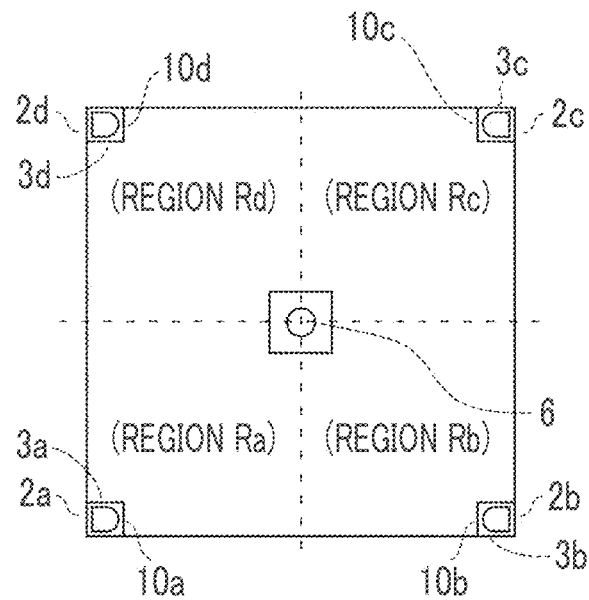
FIGS. 5A and 5B are schematic descriptive views illustrating control of the exhaust unit of the dry room according to one embodiment of the present invention.

Next, control of the exhaust unit will be described. FIG. 5A illustrates the exhaust units 2a to 2d that are disposed in the different respective regions (Ra to Rd) of the dry room 1A, respectively. Here, the regions Ra to Rd do not include a partition, and positions closest to the exhaust units 2a to 2d are set as the regions Ra to Rd, respectively and air is exhausted from the exhaust units 2a to 2d. Incidentally, the regions may be formed in which a predetermined partition with which a space of each of the regions communicates is provided and air is exhausted from each of the exhaust units 2a to 2d.

Figure 5B:
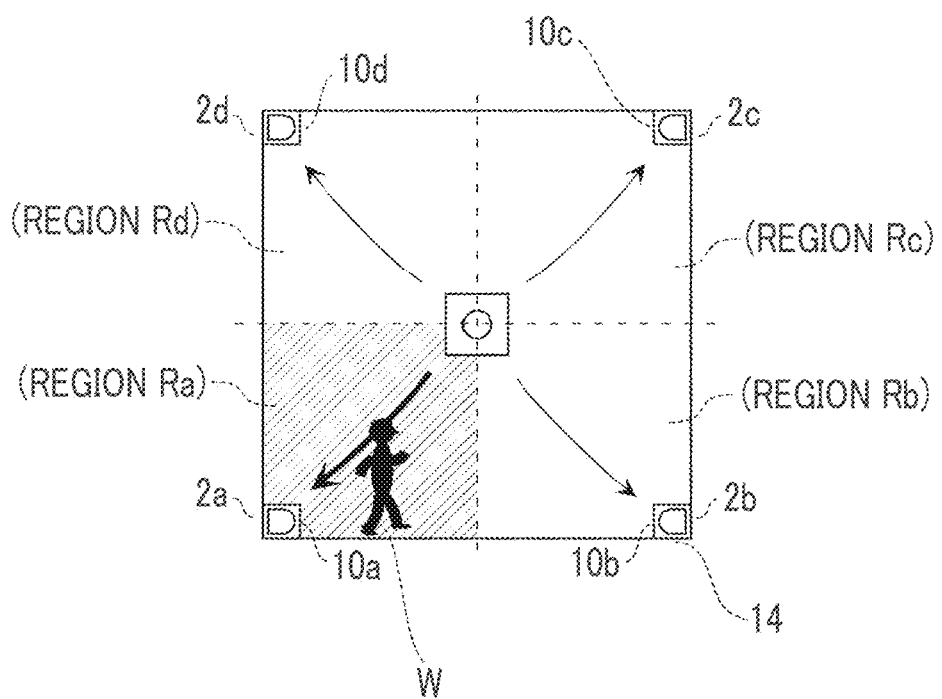

The dry room 1A of the present invention individually adjusts the exhaust amount of each of the exhaust units 2a to 2d corresponding to the exhaust of air of the regions Ra to Rd. For example, as illustrated in FIG. 5B, when a worker W performs work in the region Ra, control is performed to increase the exhaust amount of the exhaust unit 2a that exhaust air of the region Ra. Namely, when the presence of the worker is detected by the detection unit 10a, control is performed to speed up the rotation of the intake fan 17 or to increase the opening degree of the damper, thus increasing the exhaust amount of the region Ra. Incidentally, the flow of air flowing in from the supply unit 6 is illustrated by arrows, and the scale of the exhaust amount is illustrated by the thickness of the arrow.

In the dry room 1A of one embodiment, the exhaust amount of each of the exhaust units 2a to 2d can be adjusted by an operation panel 14 installed in the pillar 3b. For example, when the worker W plans to work in the region Ra, before the worker W enters the inside of the dry room 1A, the exhaust amount of the exhaust unit 2a is increased in advance by the operation panel 14. Accordingly, even when the dew point temperature of the region Ra rises during work of the worker W, air which has risen in dew point temperature can be preferentially exhausted to normalize quickly a rise in dew point temperature in the space to be managed, which is an effect.

First Detection Unit

Figure 6A:
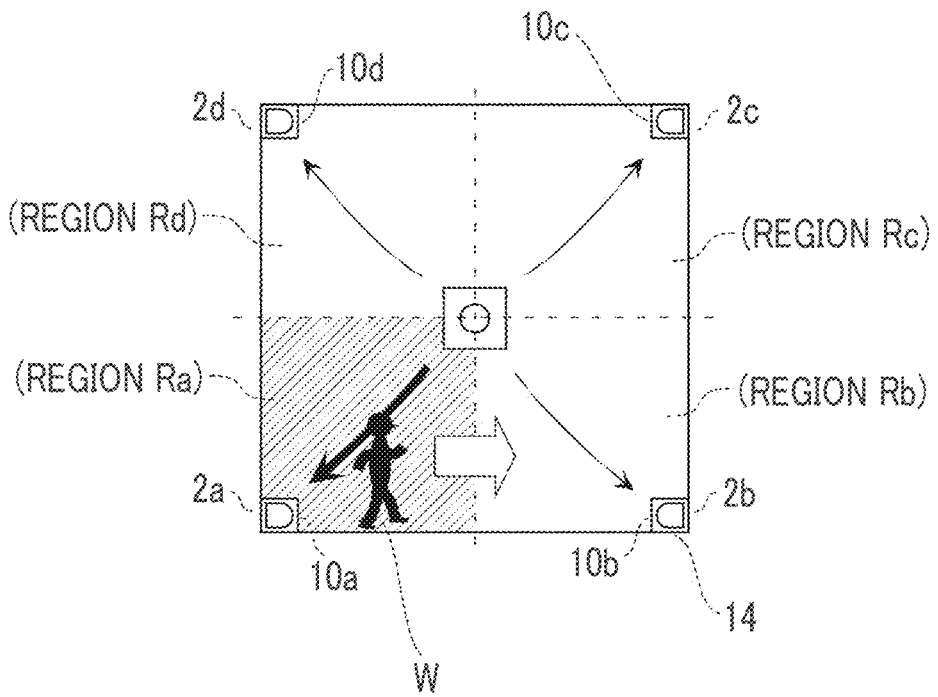
FIGS. 6A and 6B are schematic descriptive views describing control according to a detection unit of the dry room according to one embodiment of the present invention.
Figure 6B:
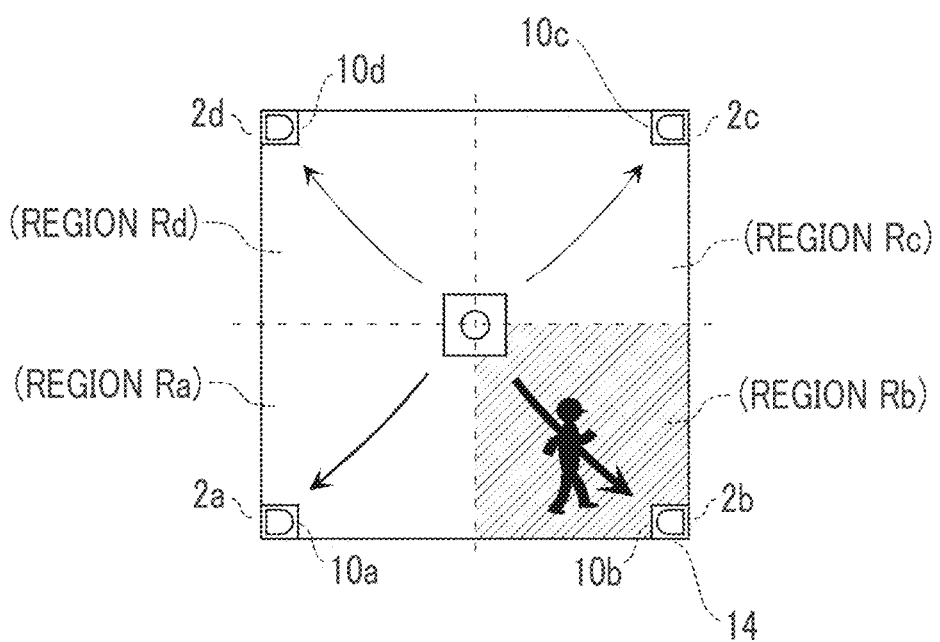

The dry room 1A of one embodiment includes the first detection units 10a to 10d that detect a substance moving in the regions Ra to Rd which correspond to the pillars 3a to 3d, respectively, and causing a rise in dew point temperature, or that measures the dew point temperature in the vicinity of the pillars 3a to 3d. Particularly, the first detection unit that detects a moving substance causing a rise in dew point temperature is referred to as an object detection unit, and the first detection unit that measures the dew point temperature is referred to as a region humidity measurement unit. For example, as illustrated in FIGS. 6A and 6B, when the worker W moves from the region Ra to the region Rb, a change in the exhaust amount of the exhaust unit by the operation panel 14 is not required. Namely, control can be automatically performed to reduce the exhaust amount of the exhaust unit 2a when the first detection unit 10a (object detection unit) does not detect the worker or the like, and to increase the exhaust amount of the exhaust unit 2b when the first detection unit 10b detects the worker or the like.

In addition, when a first detection unit 10 (region humidity measurement unit) measures a rise in dew point temperature in the vicinity of each of the pillars 3a to 3d, control can be automatically performed to increase the exhaust amount of the exhaust unit 2.

The first detection unit (object detection unit) can be used which detects a substance causing a rise in dew point temperature. Exemplary examples of the substance causing a rise in dew point temperature include a worker (human), an object containing moisture, and the like. The first detection unit that detects these is, for example, a monitoring camera, an infrared sensor, or a weight measuring device that measures a local change in weight, which detects the position a substance causing a rise in dew point temperature. In addition, the first detection unit that measures the weight of an object may have a structure in which the damper in the vicinity is mechanically opened according to the weight of the object.

In the case of the detection unit that detects a substance causing a rise in dew point temperature, since the exhaust amount can be adjusted before the amount of moisture of the space of each of the regions Ra to Rd changes, the dew point temperature can be quickly adjusted.

In addition, the first detection unit (region humidity measurement unit) can be used which measures the dew point temperature of air. Exemplary examples of the first detection unit include a hygrometer and a dew point meter that directly measure the amount of moisture in the air. As the detection unit, when a hygrometer or a dew point meter that directly measures the amount of moisture in the air is used, a change in the amount of moisture of the space of each of the regions Ra to Rd can be accurately checked, so that the dew point temperature can be adjusted with high accuracy.

Control Unit

Figure 2:
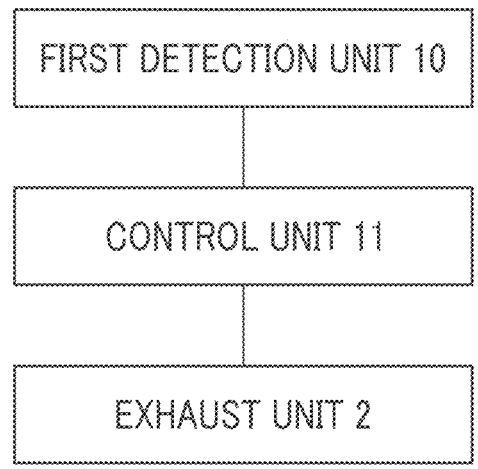
FIG. 2 is a block diagram illustrating an exhaust control method according to one embodiment of the present invention.

A control unit 11 may be provided in any place in the dry room 1A, or may be installed outside the dry room 1A. As illustrated in FIG. 2, the control unit 11 communicates with the first detection unit 10 and the exhaust unit 2. This communication may be performed by direct connection via a cable or indirect connection by a communication technique such as wireless communication.

The control unit 11 adjusts the operation of the exhaust unit 2 based on information detected by the first detection unit 10 to maintain the dew point temperature of the space 15 to be managed. Accordingly, the dew point temperature of the regions Ra to Rd can be automatically controlled.

Incidentally, when a substance causing a rise in dew point temperature is detected, the exhaust amount of the exhaust unit may be controlled according to the type or state of the substance. As an exemplary example of the control, the weight or the amount of dissipated heat of a worker is measured by a weight measuring device or an infrared sensor, and the exhaust amount of the exhaust unit is increased or decreased according to the information.

According to the above features, in the dry room 1A of the present invention, the exhaust amount of each of the exhaust units 2a to 2d that correspond to the regions Ra to Rd, respectively, is adjusted according to a change in the dew point temperature of the regions Ra to Rd in the space 15 to be managed, so that the dew point temperature in the space 15 to be managed can be efficiently and appropriately managed which has risen due to a humidity load such as a worker in a low humidity atmosphere in which the dew point temperature is −40° C. or less.

Another Embodiment

A dry room 1B according to another embodiment of the present invention further includes a second detection unit 18 compared to the dry room 1A of one embodiment. Incidentally, since other configurations thereof are the same as those of the dry room 1A of one embodiment, the description thereof will be omitted.

Second Detection Unit

Figure 7A:
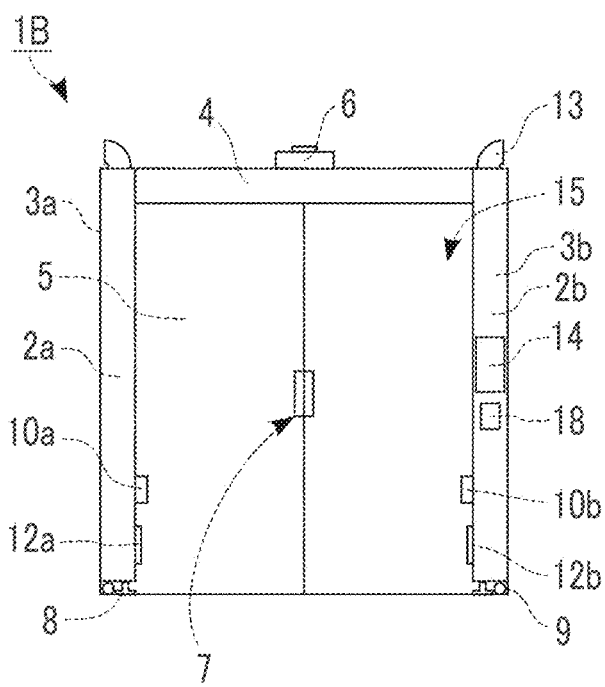
FIGS. 7A and 7B are schematic descriptive views illustrating a structure of a dry room according to another embodiment of the present invention.
Figure 7B:
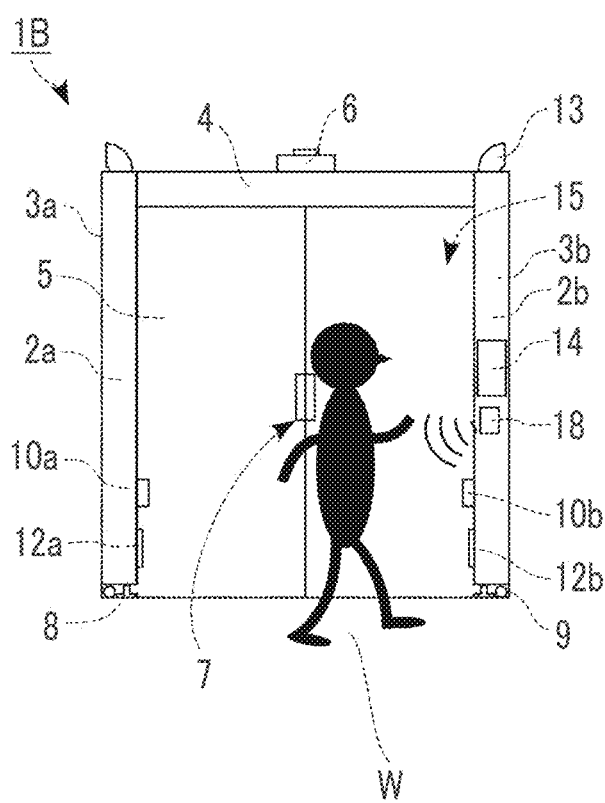

As illustrated in FIG. 7A, the dry room 1B includes the second detection unit 18 in the pillar 3b outside the space to be managed. For example, as illustrated in FIG. 7B, the second detection unit 18 detects the entry of a substance such as a worker causing a rise in dew point temperature, and sends an instruction for increasing the exhaust amount to the exhaust units (for example, the exhaust units 2a and 2b) in the vicinity of the entrance 7 in advance. Accordingly, a humidity load on the space 15 to be managed by the worker or the like can be automatically reduced.

The second detection unit 18 detects a substance causing a rise in dew point temperature, and is, for example, a monitoring camera, an infrared sensor, or a weight measuring device which detects a substance causing a rise in dew point temperature. Incidentally, as control according to the second detection unit 18, the exhaust amount of the exhaust unit may be controlled according to the type or state of the substance. As an exemplary example of the control, the weight or the amount of dissipated heat of a worker is measured by a weight measuring device or an infrared sensor, and the exhaust amount of the exhaust unit is increased or decreased according to the information.

Incidentally, the second detection unit 18 may not be installed in the pillar 3b as long as the second detection unit 18 is installed outside the space to be managed. For example, as a device independent of the dry room 1B, the second detection unit 18 may be installed on a guide line for a worker to the dry room 1B in a production facility or the like.

According to the above features, in the dry room 1B of the present invention, since the second detection unit 18 is provided outside the space 15 to be managed, prior to the intrusion of a substance causing a rise in dew point temperature, such as the entry or exit of people or the carry in or out of products, the exhaust amounts of the exhaust units in the vicinity of the entrance 7 can be increased in advance to reduce a humidity load imposed by the intrusion. Accordingly, even when there is a humidity load such as the entry or exit of people, the dew point temperature of the space 15 to be managed can be efficiently and appropriately managed.

Still Another Embodiment

Figure 8:
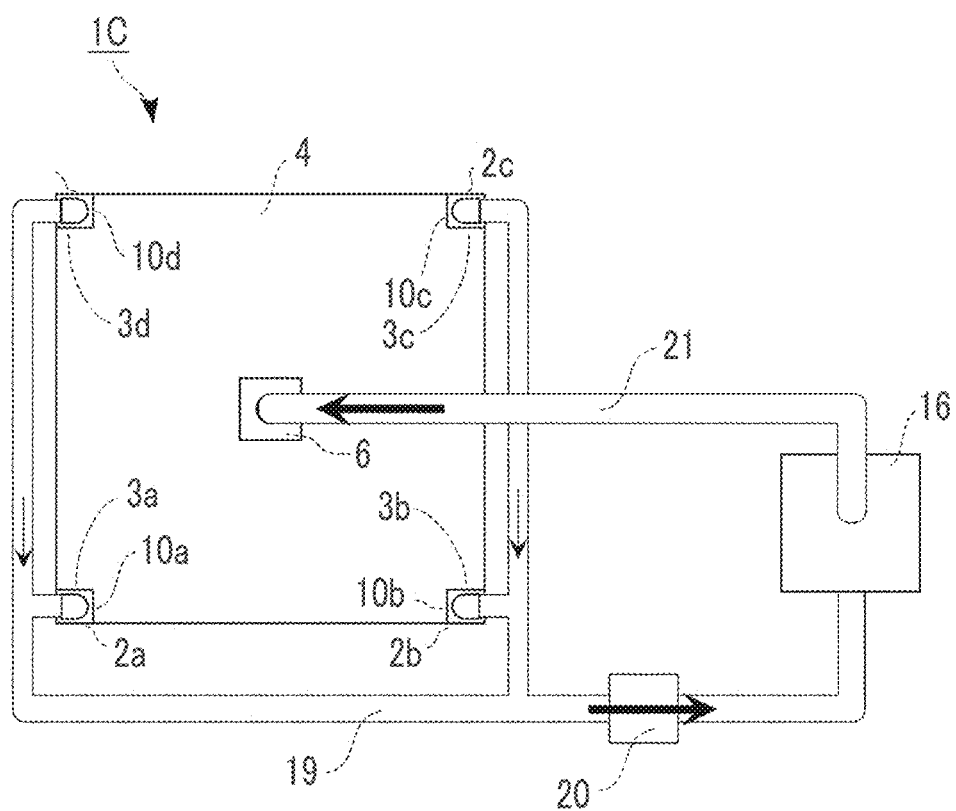
FIG. 8 is a schematic descriptive view illustrating a structure of a dry room and a dehumidifying device according to still another embodiment of the present invention.

A dry room 1C according to still another embodiment of the present invention is such that the exhaust units 2a to 2d of the dry room 1A of one embodiment are connected to the dehumidifying device 16. In the dry room 1C of still another embodiment, as illustrated in FIG. 8, the exhaust duct 13 of the exhaust units 2a to 2d is connected to one exhaust hose 19, and the exhaust hose 19 is connected to the dehumidifying device 16. In addition, the exhaust hose 19 includes an exhaust fan 20 that blows air, which has been exhausted from the dry room 1C, to the dehumidifying device 16, and the total exhaust amount from the dry room 1C is set by the exhaust fan 20.

In addition, the dry room 1C of still another embodiment does not include the intake fan 17 installed in each of the pillars 3a to 3d of the dry room 1A of one embodiment, and the exhaust amounts of the exhaust units 2a to 2d are individual adjusted by the opening degrees of the dampers of the intake ports 12 of the pillars 3a to 3d. Since other configurations thereof are the same as those of the dryroom1Aofone embodiment , the description thereof will be omitted.

According to the above features, in the dry room 1C of the present invention, since the total exhaust amount of the exhaust units 2a to 2d is controlled by one exhaust fan 20, the total exhaust amount is easily controlled, and the pressure inside the space to be managed is easily adjusted to a positive pressure, which is an effect.

Even Still Another Embodiment

Figure 9A:
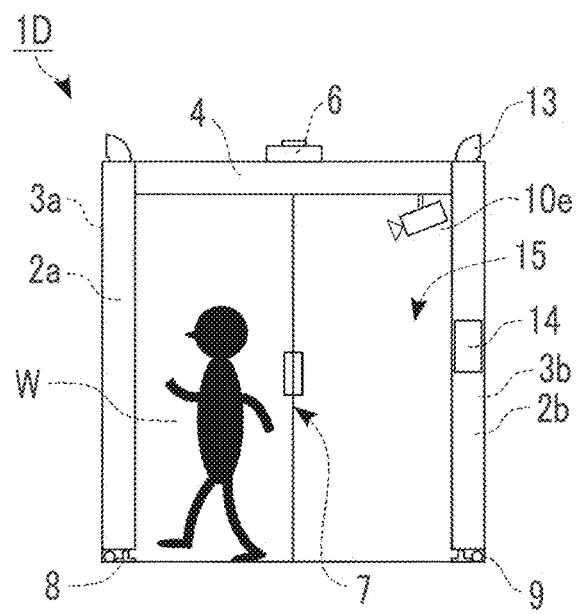
FIGS. 9A to 9D are schematic descriptive views illustrating a structure of a dry room according to even still another embodiment of the present invention.
Figure 9B:
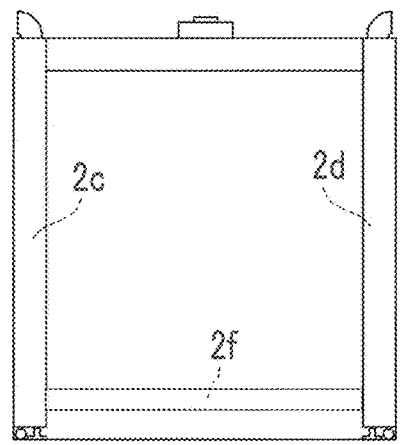
Figure 9C:
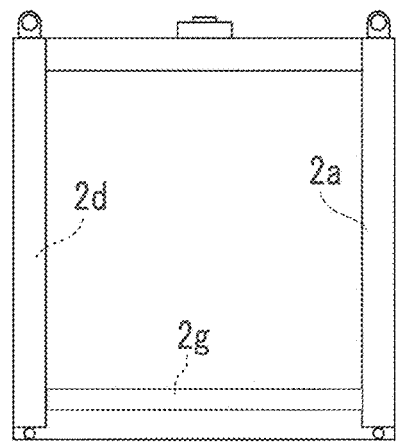
Figure 9D:
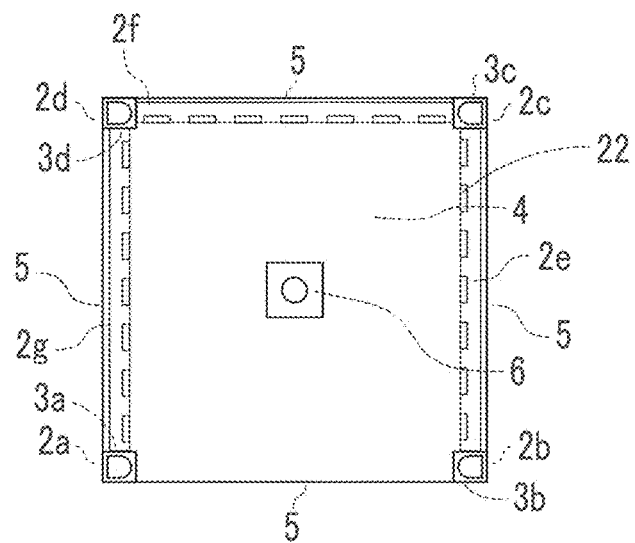

A dry room 1D according to even still another embodiment of the present invention includes exhaust units 2e, 2f, and 2g, each of which is formed of a pipe including a plurality of dampers 22, instead of the intake ports 12a to 12d of the dry room 1A of one embodiment (refer to FIG. 9D). In addition, instead of the first detection units 10a to 10d of the dry room 1A of one embodiment, a first detection unit 10e is provided which is formed of a monitoring camera (refer to FIG. 9A). Since other configurations thereof are the same as those of the dry room 1A of one embodiment, the description thereof will be omitted.

The exhaust unit 2e is a pipe that connects the exhaust unit 2b formed inside the pillar 3b and the exhaust unit 2c formed inside the pillar 3c, and the plurality of dampers 22 are installed in the exhaust unit 2e to face a space 15 to be managed side. In addition, the exhaust unit 2f is a pipe that connects the exhaust unit 2c formed inside the pillar 3c and the exhaust unit 2d formed inside the pillar 3d. The exhaust unit 2g is a pipe that connects the exhaust unit 2d formed inside the pillar 3d and the exhaust unit 2a formed inside the pillar 3a. The opening and closing operation of the plurality of dampers 22 installed in each of the exhaust units 2e, 2f, and 2g is individually controlled.

Figure 10:
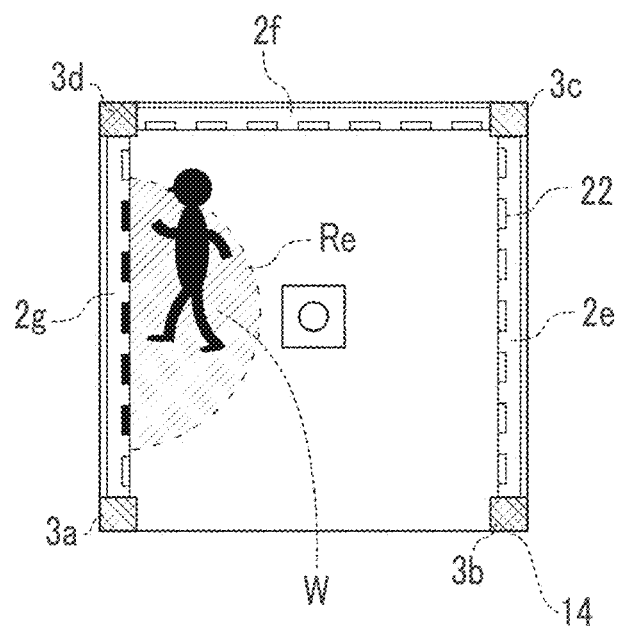
FIG. 10 is a schematic descriptive view illustrating individual control of the exhaust amount of air of a predetermined region of the dry room according to even still another embodiment of the present invention.

The first detection unit 10e is formed of a monitoring camera, and detects a substance such as the worker W causing a rise in dew point temperature in the space 15 to be managed. In control of the dry room 1D of even still another embodiment, for example, as illustrated in FIG. 10, when the position of the worker W is detected by the first detection unit 10e formed of a monitoring camera, the dampers 22 in the vicinity of the worker W are opened (the dampers 22 that are opened are illustrated in black color), and a region Re from which air that has risen in dew point temperature is preferentially exhausted is formed around the worker W. Then, when the worker W moves, the dampers 22 are appropriately opened and closed according to the position of the worker W, and air which has risen in dew point temperature is preferentially exhausted. Incidentally, the opening and closing of the dampers 22 may be fully opening and fully closing by on and off control, and the opening degree of each of the plurality of dampers 22 may be controlled.

In addition, when a substance such as the worker W causing a rise in dew point temperature is not detected (for example, when the worker W is not in the dry room), the dampers 22 at a predetermined position (for example, in the vicinity of the pillars 3a to 3d) maybe opened to control the dew point temperature in the space 15 to be managed.

Further Still Another Embodiment

Figure 11A:
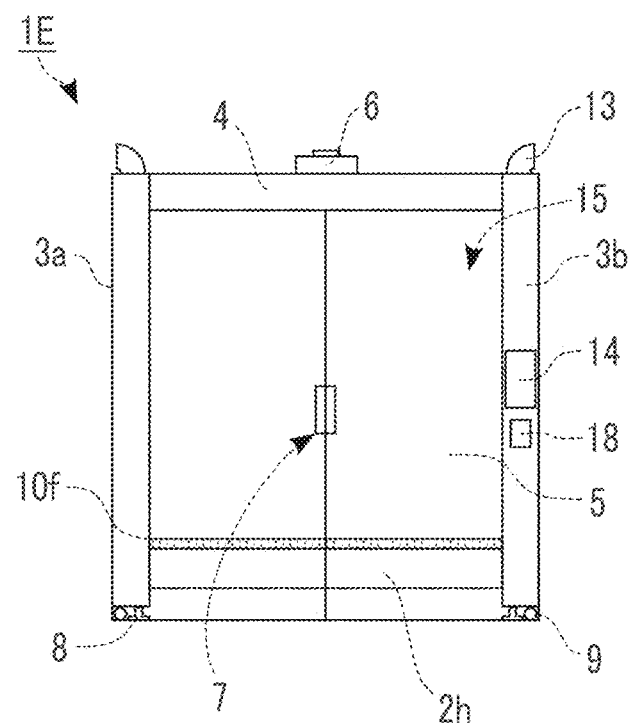
FIGS. 11A and 11B are schematic descriptive views illustrating a structure of a dry room according to further still another embodiment of the present invention.

A dry room 1E according to further still another embodiment of the present invention includes an exhaust unit 2h formed of a floor having a space thereinside, instead of the exhaust units 2a to 2d of the dry room 1C of still another embodiment (refer to FIG. 11A). In addition, instead of the first detection units 10a to 10d of the dry room 1C of still another embodiment, a first detection unit 10f is provided which is formed of weight measuring devices disposed in the entire region of the floor (refer to FIG. 11A). Since other configurations are the same as those of the dry room 1C of still another embodiment, the description thereof will be omitted.

The exhaust unit 2h is formed of a floor having a space thereinside, and the floor has a plurality of exhaust holes 23 in a surface on a side of the space 15 to be managed. In addition, the space inside the floor communicates with the ventilation passages inside the pillars 3a to 3d, and air in the space 15 to be managed is exhausted via the exhaust duct 13. The opening and closing operation of the exhaust holes 23 is individually controlled, and the exhaust amount of air in a predetermined region can be selectively adjusted.

Figure 11B:
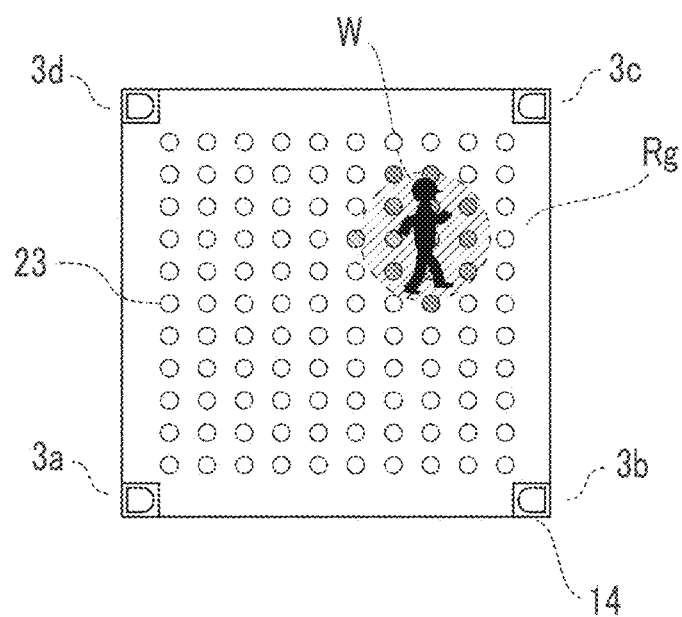

The first detection unit 10f is formed of weight measuring devices disposed in the entire region of the floor, and detects the position and the weight of a substance such as the worker W causing a rise in dew point temperature in the space 15 to be managed. In control of the dry room 1E of further still another embodiment, for example, as illustrated in FIG. 11B, when the position of the worker W is detected by the first detection unit 10f formed of weight measuring devices, the exhaust holes 23 in the vicinity of the worker W are opened (the exhaust holes 23 that are opened are illustrated in gray color), a region Rg from which air that has risen in dew point temperature is preferentially exhausted is formed around the worker W. Then, when the worker W moves, the exhaust holes 23 are appropriately opened and closed according to the position of the worker W, and air which has risen in dew point temperature is preferentially exhausted. Incidentally, the opening and closing of the exhaust holes 23 may be fully opening and fully closing by on and off control, or the opening degree of each of the plurality of exhaust holes 23 may be controlled. In addition, control may be performed to increase or decrease the region, in which the exhaust holes 23 are to be opened, according to the weight of the worker W.

In addition, as in even still another embodiment, the first detection unit formed of a monitoring camera may detect the position of the worker W, and the opening and closing of the exhaust holes 23 therearound may be controlled.

Incidentally, when a substance such as the worker W causing a rise in dew point temperature is not detected, the exhaust holes 23 at a predetermined position (for example, in the entire region) may be opened to control the dew point temperature in the space 15 to be managed.

Even Further Still Another Embodiment

Figure 12:
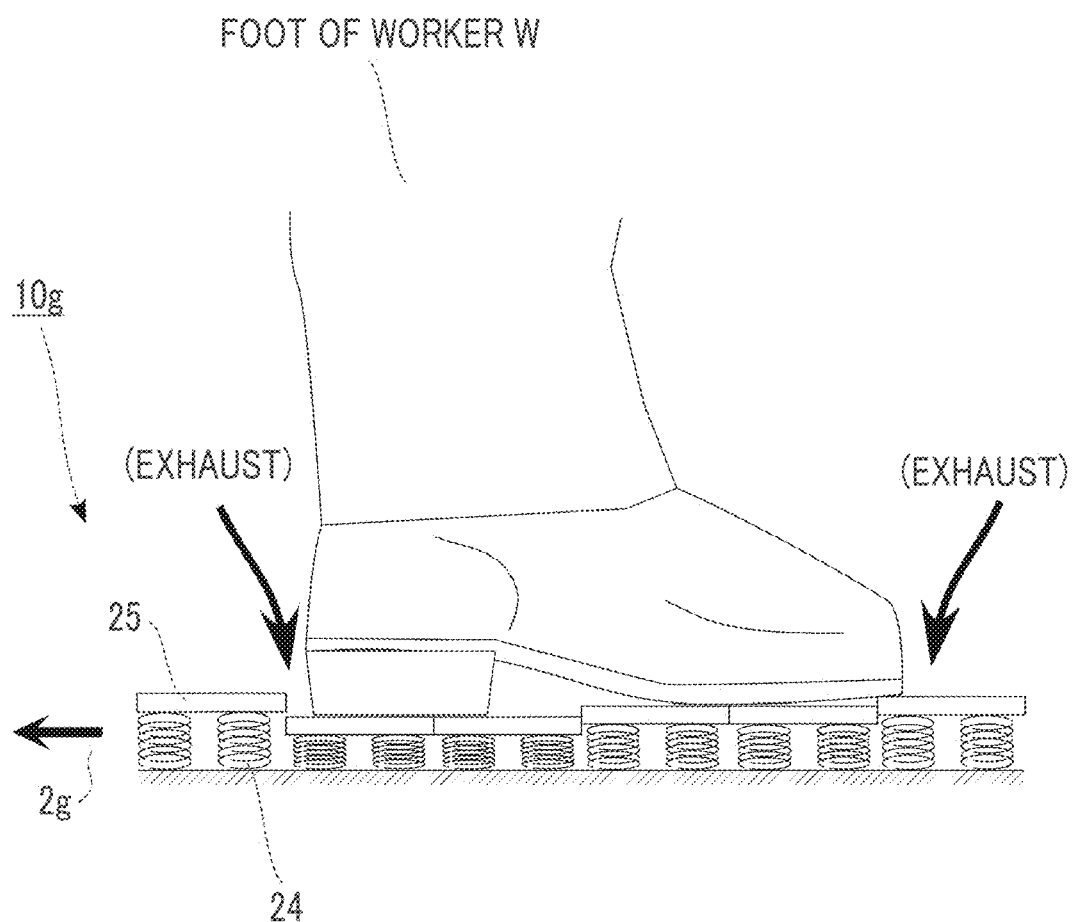
FIG. 12 is a schematic descriptive view illustrating a structure of a dry room according to a sixth embodiment of the present invention, in which the weight of an object is measured by a first detection unit and a damper is mechanically opened.

FIG. 12 is a schematic descriptive view illustrating a structure of a first detection unit 10g of a dry room according to a sixth embodiment of the present invention. As illustrated in FIG. 12, the first detection unit 10g includes a plurality of dampers 25 disposed apart from a floor, and a plurality of biasing members 24 that bias the plurality of dampers 25 upward in a vertical direction. An exhaust unit 2g that exhausts air is formed between the plurality of dampers 25 and a floor surface, and a structure is employed in which when the dampers 25 are lowered, air in the dry room is exhausted from a gap between the dampers 25. On the other hand, the dampers 25 are formed to be closed when the dampers 25 are biased upward by the biasing members 24. Incidentally, the biasing member 24 is not particularly limited, and exemplary examples of the biasing member 24 include a coil spring and a sponge.

As illustrated in FIG. 12, according to the first detection unit 10g of the dry room in the sixth embodiment of the present invention, when the worker W works in the dry room, the dampers 25 are pushed down by the feet, so that the dampers 25 are mechanically opened. Therefore, the exhaust amount of air only in a region in which the worker W is present can be locally increased, and the dew point temperature can be quickly lowered.

Incidentally, the structure in which the dampers are mechanically opened by the weight of a worker or the like may be a structure in which the dampers are opened by using push-down force generated by the weight of an object, and is not limited to the first detection unit 10g. Since the structure is used in which the dampers are mechanically opened by the weight, there is an advantage that electrical control such as a control unit is not required.

The dry room of the present invention can be used to adjust stably the dew point temperature to an arbitrary temperature for the purpose of adjusting the humidity of a work region. Specifically, the dry room capable of efficiently and quickly maintaining target humidity conditions can be provided.

In addition, the dry room of the present invention adjusts the dew point temperature of an internal space to be lower than that of an external space, to provide a work space for work to be performed under a low humidity environment such as a production process or an analysis process in the production of products such as electronic components, semiconductors, batteries, medicines, paints.

It should be understood that the invention is not limited to the above-described embodiment, but may be modified into various forms on the basis of the spirit of the invention. Additionally, the modifications are included in the scope of the invention.

What is claimed is:

1. A dry room that controls a dew point temperature in a space to be managed, the dry room comprising:
   a plurality of exhaust units that are disposed in different regions in the space to be managed and exhaust air in the space to be managed; and
   a first detection unit that detects a substance causing a rise in the dew point temperature of the air in each of the regions where the exhaust units are disposed, wherein an exhaust amount of an exhaust unit of the plurality of exhaust units in a region where the substance causing the rise in the dew point temperature is detected by the first detection unit is increased more than that of other exhaust units.

2. The dry room according to claim 1, further comprising:
a plurality of pillars,
wherein the exhaust units are provided inside the pillars, respectively.

3. The dry room according to claim 2, wherein the first detection unit is provided inside each of the pillars.

4. The dry room according to claim 2, wherein a rotation speed of an intake fan of the exhaust unit in the region where the substance causing the rise in the dew point temperature is detected by the first detection unit is increased more than that of other exhaust units.

5. The dry room according to claim 2, wherein an opening degree of a damper of the exhaust unit in the region where the substance causing the rise in the dew point temperature is detected by the first detection unit is increased more than that of other exhaust units.

6. The dry room according to claim 1,
wherein a periphery of the dry room is surrounded by a vinyl curtain.

7. The dry room according to claim 1,
wherein the first detection unit is a monitoring camera, an infrared sensor, or a weight measuring device.

8. The dry room according to claim 1, further comprising:
a control unit that controls the dew point temperature of the air in the regions.

9. The dry room according to claim 1, further comprising:
a supply unit that supplies air with an adjusted dew point temperature.

10. The dry room according to claim 9, wherein a supply amount of the air from the supply unit is set to be larger than a total exhaust amount of the plurality of exhaust units.

11. The dry room according to claim 1, wherein the plurality of exhaust units each include a ventilation passage through which air is ventilated, and an exhaust duct that is provided at an upper portion of the ventilation passage and exhausts air inside the ventilation passage to an outside.

12. The dry room according to claim 11, wherein the plurality of exhaust units each further include an intake port that is provided at a bottom portion of the ventilation passage and takes the air in the space to be managed into an inside of the ventilation passage.

13. The dry room according to claim 12, wherein an intake fan that blows the air inside the ventilation passage from the intake port to the exhaust duct is installed in the ventilation passage.

14. The dry room according to claim 12,
wherein the exhaust ducts of the plurality of exhaust units are each connected to one exhaust hose, and
the exhaust hose is connected to a dehumidifying device.

15. The dry room according to claim 14,
wherein the exhaust hose includes an exhaust fan that blows the air, which has been exhausted from the dry room, to the dehumidifying device, and
a total exhaust amount from the dry room is set by the exhaust fan.

16. The dry room according to claim 11, further comprising:
a pipe in which a plurality of dampers are installed to face the space to be managed,
wherein the pipe connects the ventilation passages to each other.

17. The dry room according to claim 11, further comprising:
a floor including a space thereinside,
wherein the floor includes a plurality of exhaust holes in a surface on a side of the space to be managed, and
the space inside the floor communicates with the ventilation passage.

18. A method for controlling a dry room that controls a dew point temperature in a space to be managed, the method comprising:
an exhaust step of exhausting air in the space to be managed from different regions in the space to be managed; and
an exhaust amount adjustment step of adjusting an exhaust amount of the air to be exhausted from a region where a substance causing a rise in the dew point temperature of the air is detected to be increased more than an exhaust amount of the air to be exhausted from other regions.

19. The dry room according to claim 1, wherein the plurality of exhaust units adjust the exhaust amount according to a type or state of the substance causing the rise in the dew point temperature of the air.

20. The dry room according to claim 1, further comprising:
a second detection unit that detects intrusion of the substance causing the rise in the dew point temperature into the regions in advance.

* * * * *